United States Patent [19]

Taylor et al.

[11] Patent Number: 5,008,226

[45] Date of Patent: Apr. 16, 1991

[54] PROCESS FOR MAKING ACID ACTIVATED BLEACHING EARTH USING HIGH SUSCEPTIBILITY SOURCE CLAY AND NOVEL BLEACHING EARTH PRODUCT

[75] Inventors: Dennis R. Taylor, Willoughby Hills, Ohio; Charles B. Ungermann, Livermore, Calif.

[73] Assignee: Engelhard Corporation, Iselin, N.J.

[21] Appl. No.: 352,578

[22] Filed: May 16, 1989

[51] Int. Cl.$^5$ .......................... B01J 21/16; B01J 20/12
[52] U.S. Cl. ...................................... 502/81; 502/72; 502/83
[58] Field of Search ................... 502/81, 82, 83, 408, 502/72

[56] References Cited

U.S. PATENT DOCUMENTS

| | | | |
|---|---|---|---|
| 1,492,184 | 4/1924 | Weir | 502/81 |
| 1,752,721 | 4/1930 | Bierce | 502/81 |
| 1,781,265 | 11/1930 | Baylis | 502/83 |
| 1,946,124 | 2/1934 | Belden | 502/72 |
| 2,018,987 | 10/1935 | Wirzmüller | 502/83 |
| 2,477,386 | 6/1949 | McCarter | 502/83 |
| 3,617,215 | 11/1971 | Sugahai et al. | 502/83 |

FOREIGN PATENT DOCUMENTS 595041  3/1960  Canada ................... 502/408

*Primary Examiner*—Carl F. Dees

[57] ABSTRACT

A process for making acid-activated bleaching earth from certain naturally occurring mixtures of calcium bentonite and attapulgite clay. The process involves treating such clay with low levels of activating acid which are mixed with the dried and ground clay, or spray dried from slurries containing the clay-acid mixture. Advantages include: lower acid costs/unit mass of clay treated, lower production costs (no washing, filtering, or waste treatment steps) and environmental soundness (no harmful environmental waste products are produced).

25 Claims, 5 Drawing Sheets

PROCESS FOR MAKING ACID ACTIVATED BLEACHING EARTH USING HIGH SUSCEPTIBILITY SOURCE CLAY AND NOVEL BLEACHING EARTH PRODUCT

RELATED APPLICATIONS

This application is related to U.S. Ser. No. 352,790 filed concurrently herewith.

FIELD OF THE INVENTION

The invention relates to a process for making acid-activated bleaching earth from certain naturally occurring mixtures of palygorskite clay (attapulgite or sepiolite ) and bentonite clay and to novel acid-activated bleaching earth products obtained thereby.

BACKGROUND

Acid-activated clays of high activity are used to adsorb colored pigments (carotenoids, chlorophyll) and colorless pigments (phospholipids) from edible and inedible oils. This process is called "bleaching" and serves both cosmetic and chemical purposes. Thus, bleaching reduces color, whereby very clear, almost water white oils are produced that meet with consumer expectations. Bleaching also stabilizes the oil by removing colored and colorless pigments which tend to "destabilize" the oil, resulting in oils that rancidify more easily if they are not removed. The current, and expected long term trend, favors the use of highest possible bleaching efficiency clays with this process because: (i) the smaller amounts of the high activity clays needed to produce desired refined oil properties mean that lower inventories can be maintained by the oil refiner; (ii) refined oil losses depend somewhat on the amount of clay used because less of high activity clay needs to be used and therefore oil losses are lower; and (iii) less spent clay is produced when using high activity clay, and hence land-fill disposal costs are lower.

The conventional process for producing acid-activated bleaching clays utilizes calcium bentonite clays and requires relatively high acid dosages to achieve maximum bleaching efficiencies. The calcium bentonites used in the process are hydrated sodium calcium aluminosilicates which typically are mildly basic. The manufacture of highest quality commercial bleaching earths typically require 70–90 grams of 96% $H_2SO_4$/100 grams of dry clay or 67.2–87.4% acid dosage where:

$$\% \text{ Acid Dosage} = \frac{\text{wt. of pure acid}}{\text{wt. of dry clay}} \times 100.$$

Extensive leaching of the clay structure in the form of solubilized salts takes place and these are removed in the process. Because of these high acid dosages, and the extensive leaching that takes place during the leaching process, the yield of bleaching clay is low (typically in the range of 75-85 wt %). The acidic salts formed during activation and residual acid must be washed off and separated by filtration from the product clay. If high levels of unused acid and acidic salts (iron and aluminum sulfates) are left in the clay, the quality of the bleached oil is impaired. High residual acid levels generate undesirable free fatty acids from the fatty acid triglycerides in the oil. Finally, the leachate (acidic salts and residual acid) is a waste stream that contains materials harmful to aquatic life and therefore must be neutralized or otherwise disposed of in an environmentally acceptable manner. This constitutes an additional expense of producing bleaching clays from pure calcium bentonites.

Clay sources used in the past to provide acid-activated bleaching clay of high activities have been primarily restricted to calcium bentonites, i.e., clays in which the principal exchangeable cation is a calcium ion, and these are sometimes also referred to as sub-bentonites.

Another type of naturally-occurring clay simply requires heat to impart bleaching activity. These are the clays rich in the minerals attapulgite or sepiolite, now frequently classified as palygorskite clays. Mineralogically, the palygorskite clays are readily distinguishable from the bentonites (smectites or montmorillonites) and rarely are palygorskites and bentonites used interchangeably.

It has been the general belief that palygorskite clays do not respond to the conventional acid-activation treatment. The same is true of certain bentonites, namely sodium (swelling) bentonites, such as Wyoming bentonites.

The following publications pertain to the art of preparing bleaching earths from naturally-occurring clays.

A. D. Rich, "Bleaching Clay", Industrial Rocks & Minerals, 3rd. Ed., AIME, N.Y. pp 92–101 (1960).

R. Fahn, "Bleaching Earths-Preparation, Properties, Practical Applications", Chapter 1 Internal Symposium, Brussels, April 28-29 (1976).

L. L. Richardson, "Use of Bleaching Clays in Processing Edible Oils", JAOCS, 55, 777 (1978).

G. M. Clarke, "Special Clays", Ind. Minerals, Sept., 25 (1985).

D. R. Taylor, D. B. Jenkins, "Acid-Activated Clays", Soc Mining Eng Of AIME, Transactions, 282 1901 (1988).

R. L. Grim, "Applied Clay Mineralogy", pp 320–326, (1962).

A. C. D. Newman, "Chemistry of Clays and Clay Minerals," pp 107–114, (1987).

The following patents relate to the production of acid-activated bleaching earths:

U.S. Pat. No. 1,397,113 (1921); Prutzman
U.S. Pat. No. 1,579,326 (1924); Kauffman
U.S. Pat. No. 1,642,871 (1927); Chappell et. al.
U.S. Pat. No. 2,470,872 (1949); Secor
U.S. Pat. No. 2,472,489 (1949); Pierce
U.S. Pat. No. 2,484,828 (1949); Hickey
U.S. Pat. No. 2,553,239 (1946); Christianson
U.S. Pat. No. 2,563,977 (1949); Van Horn, Kahn
U.S. Pat. No. 2,574,895 (1951); Stecker
U.S. Pat. No. 2,671,058 (1952); Mickelson
U.S. Pat. No. 2,872,419 (1959); Farnand
U S. Pat. No. 2,892,800 (1959); Taipale
U.S. Pat. No. 2,981,697 (1961); Mickelson, et. al.
U.S. Pat. No. 3,617,215 (1971); Massaire, et. al.
EPA No. 0,276,954 (1988); Alexander Generally, in the patents listed above, calcium bentonites are the source clays and high acid dosages, typically above 40-50 gms of 96% $H_2SO_4$/100 gms of dry clay, are required for maximum improvement in bleaching efficiency. The acid treated clay is invariably washed to remove soluble salts and entrained acid. See, for example, U.S. Pat. No. 1,397,113, U.S. Pat. No. 1,642,871 and the recently published EPA (0,276,954).

It is known to add citric acid to oils that are bleached with mixed attapulgite/calcium bentonite bleaching earths in order to enhance chlorophyll adsorption. Citric acid is not used to activate the clay.

U.S. Pat. No. 3,029,783 (Sawyer, et al), directed to an improved animal litter composition, describes an acid treatment, preferably using an attapulgite clay, which employs relatively low acid dosages without washing. The processing requires a calcination treatment at 700°–1,000° F. prior to the acid treatment and a second calcination at 750°–1,100° F. after acid treatment. The patent is not directed to the manufacture of a bleaching earth and we have found that the procedure does not lead to the preparation of a high efficiency bleaching earth.

THE INVENTION

Surprisingly, it has been found that certain mildly acidic uncalcined naturally-occurring mixtures of palygorskite clay and calcium bentonite clay, hereinafter referred to as "high susceptibility source clays" or "HSSC" require significantly lower acid dosages (e.g., 5–10 grams of 96% $H_2SO_4$/100 grams clay) to achieve their maximum bleaching levels. Because so little acid needs to be used with these naturally-occurring clay mixtures, residual acid levels left on these clays are quite low and subsequent washing, filtration steps or post-calcination steps are unnecessary. In fact, it has been found that the requisite acid can simply be sprayed on dry powdered clay, or a clay-acid slurry can be mixed and then spray dried, to produce a high activity bleaching clay.

Palygorskite clays include attapulgite clays also known as Attapulgus clay, or Georgia-Florida fuller's earth. These clays are usually frequently composed principally of the mineral attapulgite, a crystalline hydrated magnesium aluminum silicate, but may also contain significant amounts of other minerals such as bentonite (montmorillonite), calcium carbonate, quartz and feldspar, and in some cases sepiolite. Those attapulgite/bentonite mixtures. I believe these particular clays have features uniquely favorably for low acid dosage activations.

In the accompanying drawings:

FIG. 1 illustrates the convention process for producing bleaching clay from conventional calcium bentonite source clays.

FIG. 2 outline the essential steps of the spray coating process of the invention.

FIG. 5 shows the change in $SiO_2$ and $Al_2O_3$ and FIG. 6 shows the change in iron, calcium, magnesium and phosphorus of the same HSSC clay.

DESCRIPTION OF PREFERRED EMBODIMENTS

Figure 1:
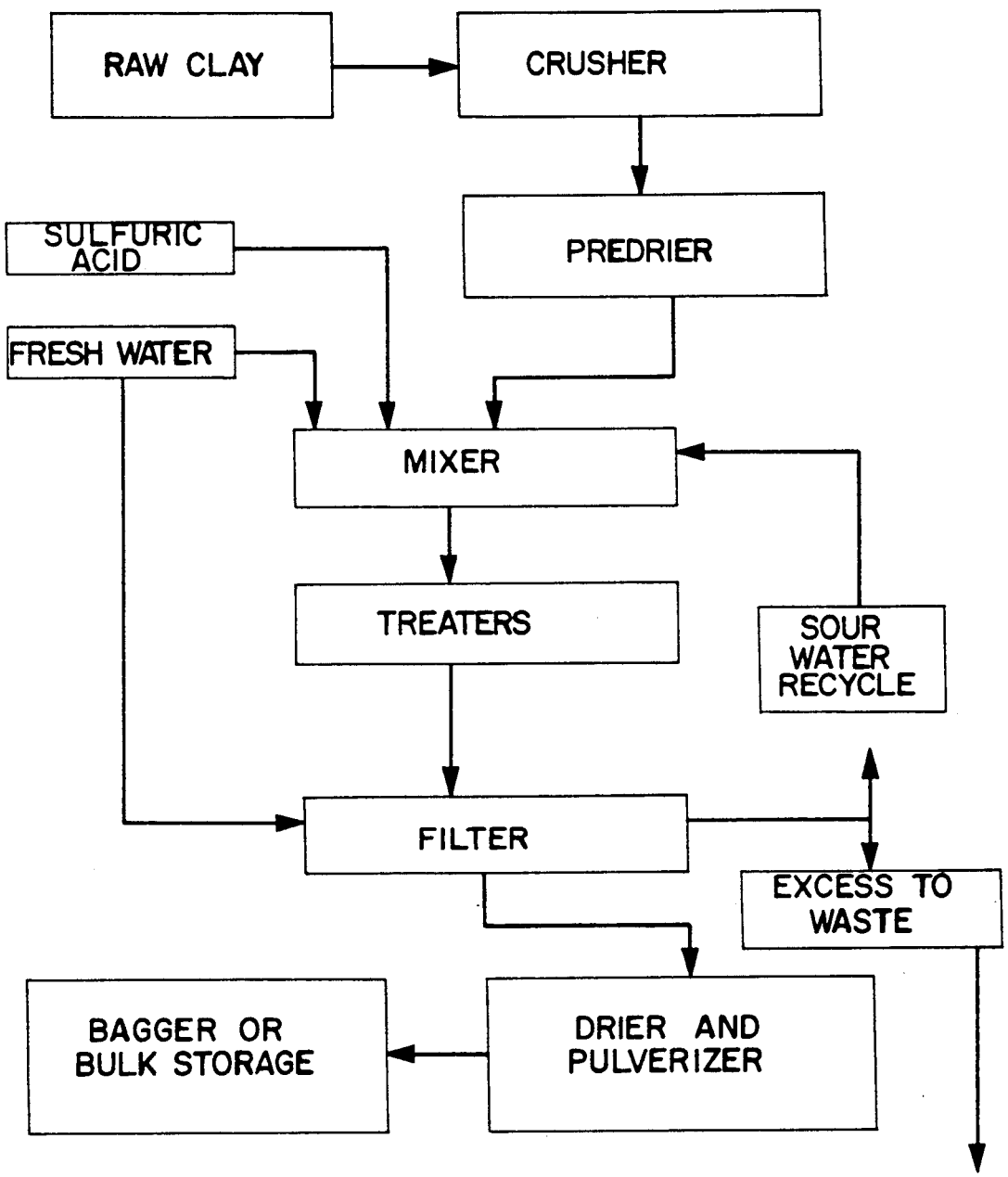

By high susceptibility clay, we mean those naturally occurring attapulgite/bentonite mixtures which: (1) contain 10–90% attapulgite, generally from 20% to 60% attapulgite, (2) possess a slurry pH less than 7; and (3) have pore volume greater than about 0.20 cc/gm. The especially preferred ranges are from about 37–78% attapulgite, pH 5.4–6.5, and pore volume 0.25–0.35 cc/gm.

Mixed attapulgite/bentonite clays possessing the desired properties for use in this invention are found in sedimentary beds located in the state of Georgia near the town of Ochlocknee, in Thomas County. According to Grim (Clay Mineralogy, 2nd Ed., McGraw-Hill Book Co., New York), such clay deposits are often formed when detrital materials are laid down and transformed in magnesium rich lacustrine environments. At any rate, clays of the desired type obtained from the Ochlocknee area have properties as shown below.

| Physicochemical Properties of High Susceptibility Attapulgite/Bentonite Source Clay (Typical) | | | | | |
|---|---|---|---|---|---|
| Chemical Analysis (Wt %, Vf basis) | | | | Physical Analysis | |
| $SiO_2$ | 71–75% | CaO | 0.70–2.3% | pH (10% slurry) | 5.0–5.8 |
| $Al_2O_3$ | 11–16% | $Na_2O$ | 0.20–0.40% | Surface area ($m^2$/gm) | 100–150 |
| $Fe_2O_3$ | 3.8–6.7% | $K_2O$ | 1.1–1.5% | Pore Volume (cc/gm) | 0.20–0.31 |
| MgO | 2.8–5.8% | $P_2O_5$ | 0.30–1.2% | | | clay used in the practice of this invention contain at least about 10% by weight and up to about 90% by weight, preferably from 20% to 60% by weight, of the mineral attapulgite and are limited to those clays which are low in their content of carbonate minerals. This excludes most commercial deposits of primary and sedimentary sources of attapulgite clay which are usually associated with limestone. Similarly, naturally-occurring mixtures of sepiolite and bentonite clays must be low in content of carbonates to be used in practice of the invention.

The results of experiments conducted with high purity, low carbonate attapulgite showed that it takes 10–30 wt % acid dosages to achieve maximum activity with these materials. Even higher acid dosages (i.e. 70–90 wt %) are required to achieve maximum adsorptive capacities for bentonite clays. It was found that very low acid dosages (1–10%, preferably 3–5 wt %) will work only with the particular naturally occurring The invention is not limited, however, to the use of such clay.

In defining clays the terms "volatile matter" (V.M.) and "Loss on Ignition" (L.O.I.) must frequently be used. Volatile material is classified according to three levels of thermal treatment: loosely-held water of hydration known as free-moisture (F.M.) which is measured by heating to constant weight at 220° F., structural water that is held chemically in the molecular structure of the clay and is measured by heating from 220° F. to constant weight at 1200° F., and other volatile matter such as inorganic carbonates, principally calcium carbonate, which release $CO_2$ at 1800° F.

Various methods related to water content or thermal treatment may be used to express percentages of components in the clay. A moisture-free weight, or dry weight, is the weight of the clay after heating to constant weight at 220° F. A volatile-free basis weight is the weight of the clay after heating to constant weight at 1200° F., and a loss-on-ignition or L.O.I. basis weight is determined by heating to constant weight at 1800° F. Also, volatiles content may be expressed on an as received basis.

The difference between loss on ignition weight and volatile-free weight is a fairly accurate representation of carbonate content, since carbonates generally account for virtually all of the non-aqueous volatile matter in the clay. An alternative method for measuring the carbonate content (as % $CO_2$) is to finely pulverize the clay and heat in the presence of a strong mineral acid such as hydrochloric acid to release carbon dioxide. The gas can then be collected and its volume measured, from which the weight percent of $CO_2$ can be calculated. This former method was employed to determine the carbonate content of clays used in the examples described hereinafter.

XRD METHOD OF DETERMINING ATTAPULGITE CONTENT

X-ray diffraction is used to determine the attapulgite content of the attapulgite/montmorillonite clays described in this patent application (referred to as high susceptibility source clays). To do this, a comparison is made between the peak areas of the 110 peak of attapulgite and the 001 peak of the montmorillonite in the region 3°-20° $2\theta$ when XRD machine conditions are as follows:

beam slit—0.2°
baseline—0.15 V
window—1 V
Cu K—$\alpha$/Ni filter
beam current—31 mA
voltage—40KV
rate—$\frac{1}{2}$°/min.
chart speed—1 cm/min.
range—1K or 10K CPS
time constant—1 sec.

In order to calibrate the intensity of these two peaks, a series of mixtures of pure crude attapulgite (Emcor ® 66 low-carbonate attapulgite clay supplied by Engelhard Corporation) and pure crude bentonite (Filtrol Gr 2) were prepared by mixing known quantities of the finely ground powders (100% T-325 mesh) whose moisture contents were also known. With this information (i.e.—weight and moisture content of the clays used) and the resultant XRD patterns for each of the mixtures, it is possible to calibrate the relative response of these two peaks to the x-ray beam. The assumption is made that the response of these peaks in a physical mixture is the same as it will be in the naturally occurring mixture of these two clays. Using this method, it was determined that the intensity correspondence between the 110 peak of attapulgite and the 001 peak of montmorillonite was 1:2.32.

X-ray patterns of suitable HSSC was found to be essentially the same as would be expected from X-ray patterns of mechanical mixtures of attapulgite and calcium bentonite, although a low intensity peak at 7.2 Angstrom units was observed from a HSSC that was not observed in X-ray patterns of either pure attapulgite or calcium bentonite or their mechanical mixtures.

Mineral acids (hydrochloric, phosphoric and sulfuric), a strong organic acid (formic) and a complexing acid (citric) have been utilized in practice of the invention. Sulfuric acid is preferred.

In one embodiment of the invention, 3-5% by weight of concentrated acid (based on the dry free weight of clay being activated) is added to enough water and clay so that the dry free solids content of the resultant clay/acid/water slurry is in the range 20-25 wt %. Thereafter, the slurry can be heated for 1-5 hours with gentle stirring, filtered (washing is not necessary, but can be practiced), dried, and ground to yield a finished product suitable for use as described below. Although higher acid dosages may be employed, no significant advantages are imparted by this effort, and since acid is a costly reagent, lower acid dosages are preferred. (See Table 1).

In general, the process of the invention comprises selecting an acidic naturally-occurring mixture of bentonite/palygorskite clays, crushing, preferably subjecting the clay to a preliminary drying step; typically to 15 to 30 wt % VM, grinding the dry clay, mixing the clay with a diluted acid, drying and thereafter pulverizing unless the acid treated clay is already in desired particulate form. Preliminary drying is carried out under conditions such as to render the clay amenable to the grinding method used, e.g., heating at 200°-300° F. to reduce 15 to 25 wt % VM. Optionally, the source clay is extruded before drying and grinding. In some instances, grinding can take place before drying.

Reference to FIGS. 1-4 serves to illustrate advantages and essential differences between the processes made possible by the use of high susceptibility source clays in accordance with this invention (FIGS. 2-4) and conventional calcium bentonite source clays (FIG. 1).

As shown in FIG. 1, conventional processing entails crushing, predrying (necessary so the clay particles will break apart or "slake" properly when added to water to give a uniform, colloidal dispersion suitable for activation), a mixing step (where clay, acid and water are combined), a treater or "leach" step (where the clay/acid/water slurry is heated to near boiling with gentle agitation for about 5 to 5½ hours), and a washing/filtration step (where entrained unused acid and acidic salts are extracted from the filter cake). Some of the liquid waste stream from this step can be recycled back to the mixer, but the greater majority must be disposed of by other means. Since aluminum containing salts formed from the reaction between the acid and bentonite clay during the leaching process are highly toxic to aquatic life, the waste stream from this process cannot be discharged to surface waters or to the subsurface water table. In some cases, an expensive deep well injection facility must be maintained to dispose of these wastes, and in other cases, the acidic wastes are precipitated with lime or caustic, and the neutral solids produced are placed in land-fill. In any case, some method of waste disposal is required for an environmentally sound operation. The extracted filter cake from this operation is then dried ground, and bagged or placed in bulk storage.

In contrast to the process just described, processes of the invention utilizing high susceptibility source clays are simpler, more economical and do not generate waste products which are difficult to dispose of and add to production costs.

Figure 2:
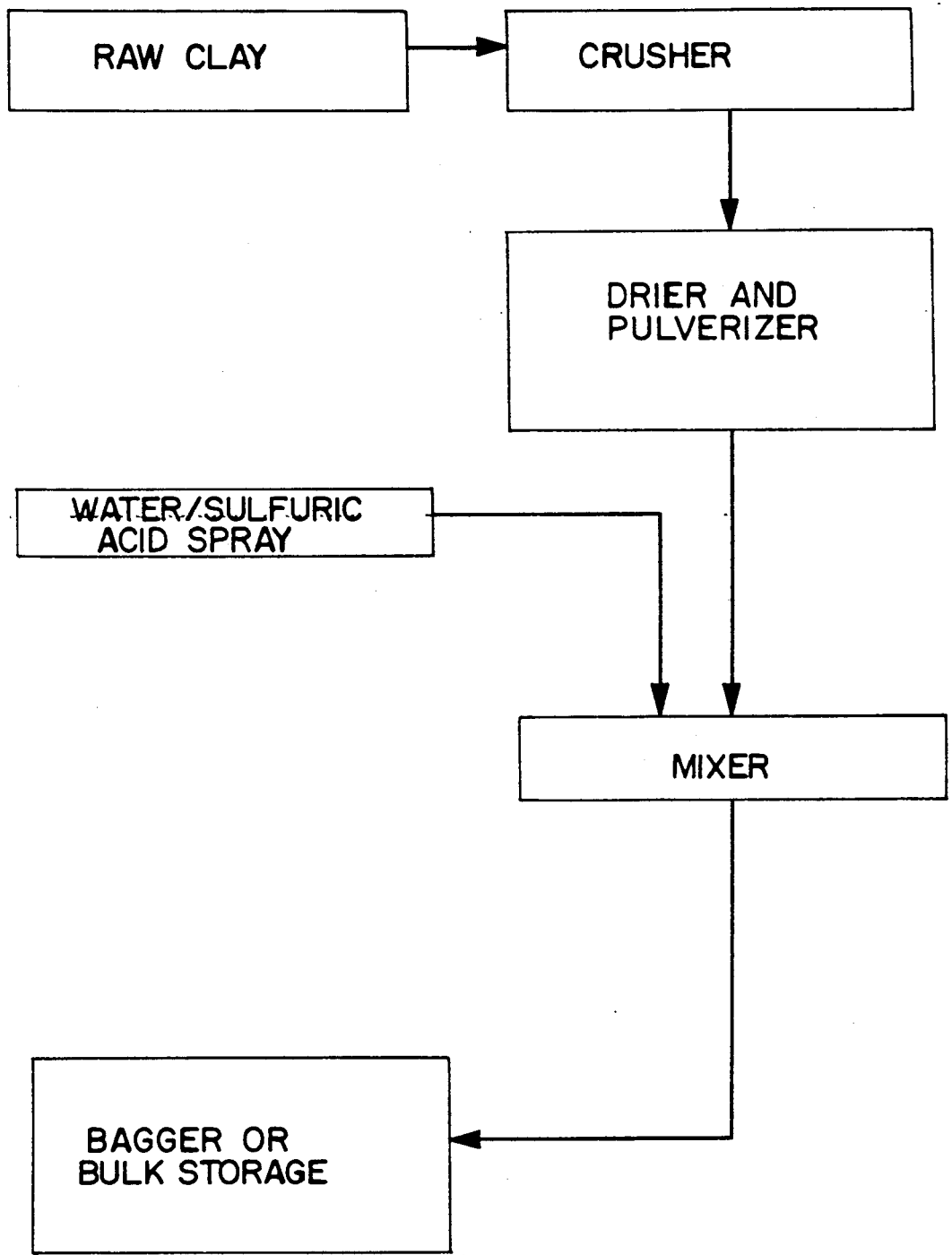

FIG. 2 outlines the essential steps of the spray coating process for producing acid-activated bleaching clay from high susceptibility source clays. In accordance with one embodiment of the invention, the coarse feed from the crusher (nominal ¼" diameter particles) is feed directly to a drying and grinding operation where it is dried to a level somewhat drier. than desired for the finished product, and ground to the desired average particle size. Typically, the production has 10–15 wt % VM and 80–85 wt % is finer than 200 mesh.

An acid/water mixture is then sprayed directly onto the dried and ground powder using such proportions of acid and water that optimized bleaching performance of the finished product is attained. Preferably, the acid/water spray is added directly to the powder while it is still warm and before it takes up moisture from the surrounding atmosphere. Intimate mixing of the raw clay powder and the acid/water spray can be achieved by any number of methods, including, for example, spraying the acid/water into the clay as it is mixed in a glass-lined Pfaudler mixing vessel, by spraying acid solution into the tumbled clay powder in a rotating rotary pan spray-coating machine, by spraying onto the clay as it travels along a moving belt conveying system, or by spraying onto the clay as it is moved by a screw conveyor. The dried, ground powder, now impregnated with the acid/water mixture, is bagged or placed in bulk storage as finished product.

Figure 3:
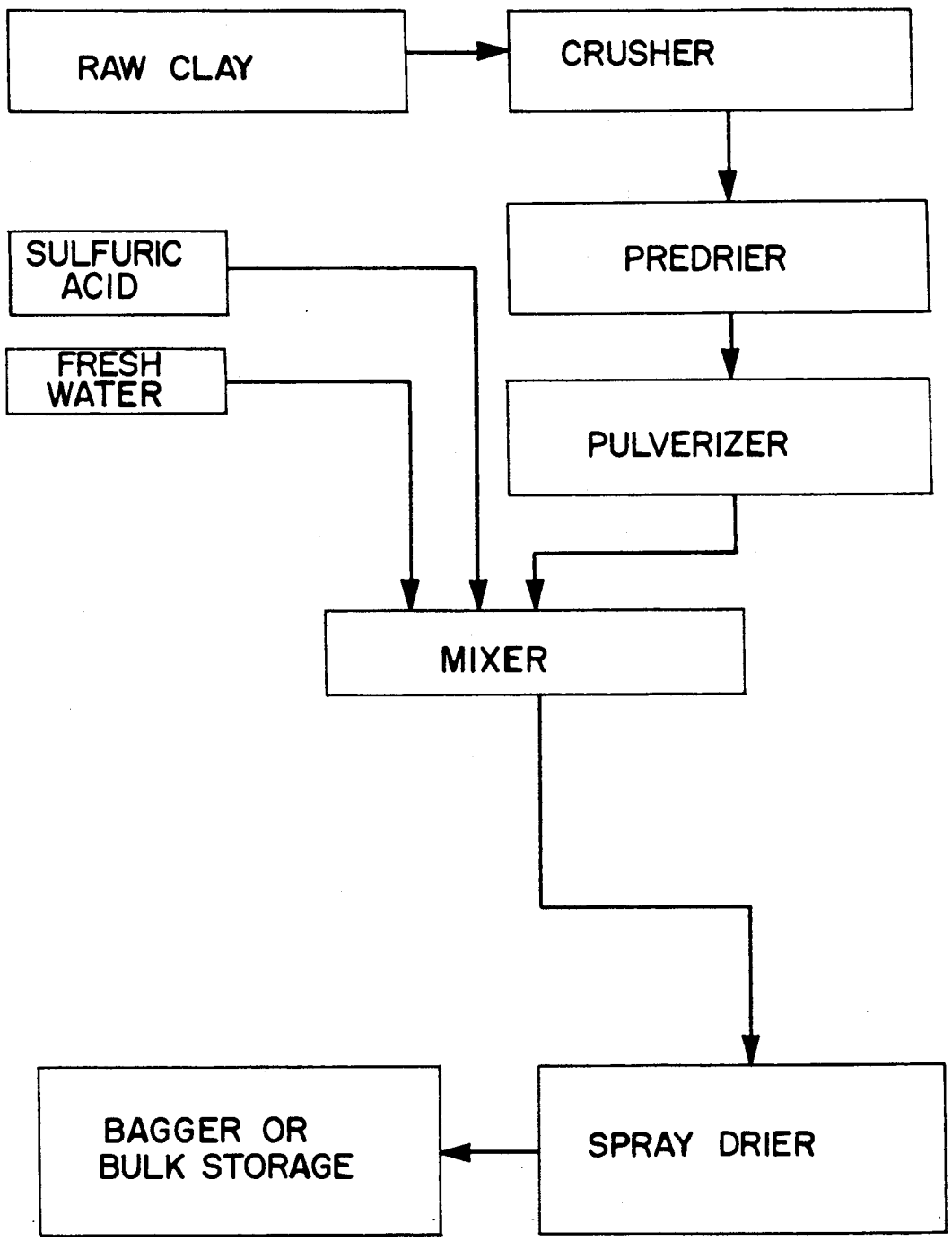
FIG. 3 illustrates the spray drier process of the invention.

FIG. 3 outlines the essential steps of the spray drying process to produce acid-activated bleaching clay from high susceptibility source clays. In this case, raw clay is first crushed, then dried, typically to 20–30 wt % VM at 200°–300° F., and pulverized to produce a finely ground powder (e.g., 99%-200 mesh) suitable for spray drying using either high pressure nozzles or a spinning disk as commonly used in these apparatus. The finely ground clay is mixed with sufficient water and requisite sulfuric acid to form a slurry which can be spray dried. The high susceptibility source clay used in this process will be activated instantaneously during the spray drying operation; therefore, heating of the slurry before the spraying operation need not be practiced although such heating will not be deleterious to the final product. The spraying conditions are set to produce spray-dried particles whose average diameter falls in the range 15–30 microns. These particles of acid-activated high susceptibility source clay can be bagged or placed in bulk storage as finished product.

Figure 4:
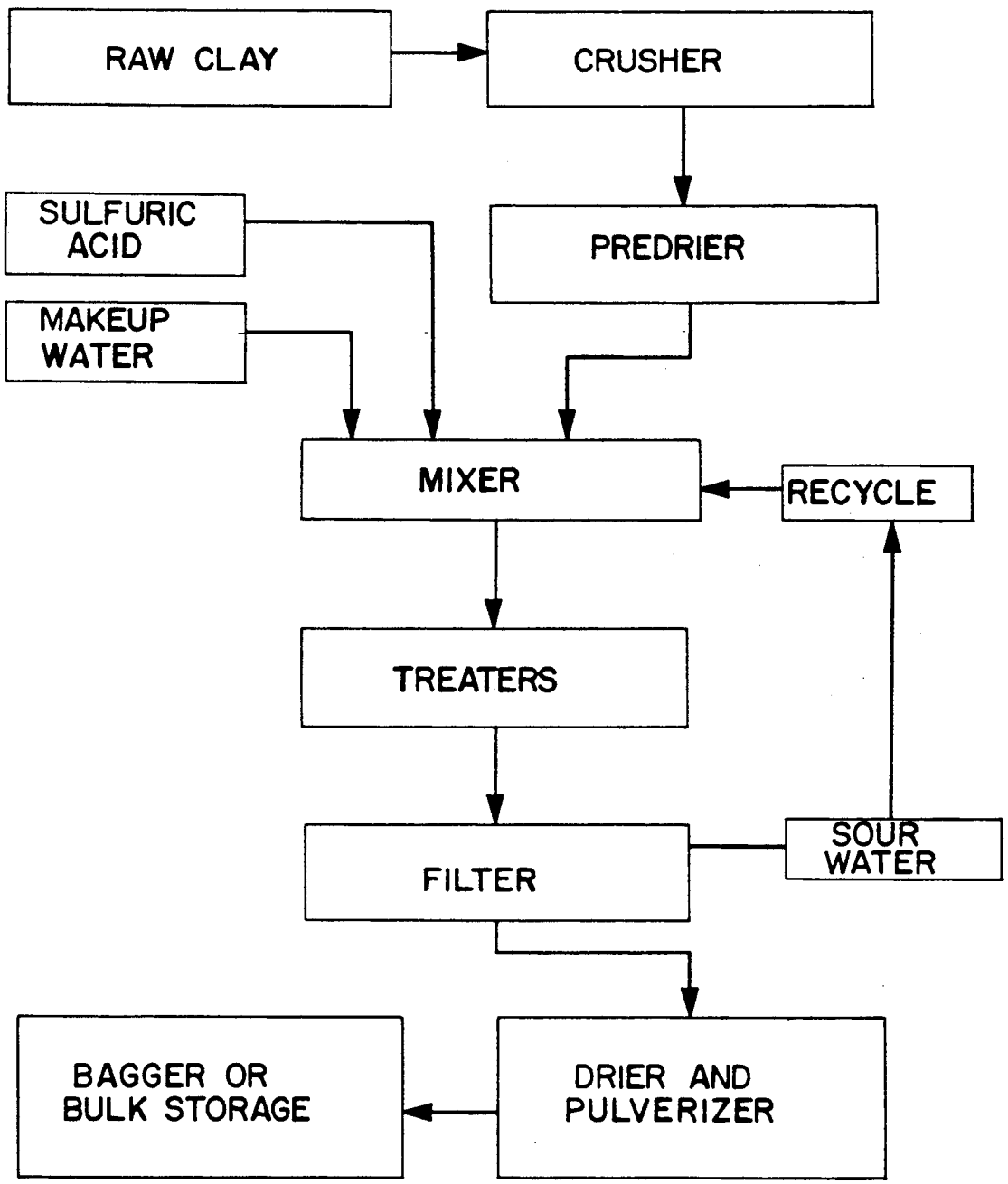
FIG. 4 illustrates another embodiment of the invention.

FIG. 4 outlines the essential steps of the modified conventional process to produce acid-activated bleaching clay from high susceptibility source clays. This process uses the same equipment and process train as that previously described for a conventional acid-activation process (FIG. 1), but with the following essential differences: (i) much lower acid dosages are employed (i.e., 3–10 grams of 98% $H_2SO_4$/100 grams of dry clay); (ii) shorter reaction times can be employed (1–3 hours); (iii) 100% of the "sour" water which is recovered from the filtration step can be recycled back to the mixing step where only enough additional water plus fresh mineral acid is added to achieve the desired levels of bleaching activity; and (iv) since all of the sour water is recycled, there is no waste stream of acidic salts and unused acid requiring disposal.

When edible (and inedible) animal or vegetable oils are treated with bleaching clays, the objective is to reduce the levels of certain trace constituents (including carotenoids such as B-carotene, pheophytins and chlorophyll, and peroxides, among others). Color pigments, such as B-carotene (reddish-orange pigment) and chlorophyll (green pigment) must be removed if the oils is to be of suitably light color to meet with consumer acceptance; peroxides (highly reactive molecules) must be removed in order to obtain an oil exhibiting good photolytic and chemical stability (i.e.,—one which will not rancidify easily). Additionally, it is desired that levels of free fatty acids produced when contacting vegetable oils with acid-activated bleaching clays should not be excessively high since they constitute a refining loss.

Those familiar with the art of bleaching are aware of these and other quality control tests to monitor oil quality during bleaching. Red and yellow color is commonly monitored using an automatic tintometer according to the procedures listed in the American Oil Chemists' Society Official and Tentative Methods (AOCS Official Method Cc 13b-45); chlorophyll (AOCS Official Method Cc 13d-44); peroxides (AOCS Official Method Cd 8-53; rev. Ja 8-87); and free fatty acids (AOCS Official Method Ca 51-40). In all cases, the lower the values obtained, the better the quality of the resultant oil. Typically, for instance, when bleaching a caustic refined soybean oil, refiners find that chlorophyll reduction is the most important quality parameter, and over time, it has been found that adequate bleaching has occurred if this constituent can be reduced to the 50–90 ppb range. When this level is obtained, other oil constituents are usually well below the levels of which they would cause problems with regard to achieving satisfactory finished oil quality.

The following examples are presented in order to more fully explain and illustrate the invention. The examples are not be construed as limiting the invention.

EXAMPLE 1

Three different source clays (A—high purity attapulgite clay; B—high purity bentonite clay; and C—high susceptibility clay) were subjected to acid-activation with sulfuric acid at varying acid dosages for 5½ hours, and then washed, filtered, dried and ground to finished products.

Following are chemical and physical properties of clays A, B and C along with a summary of activation conditions.

| | CHEMICAL/PHYSICAL PROPERTIES OF STUDY CLAYS | | | | | | | | | | | |
|---|---|---|---|---|---|---|---|---|---|---|---|---|
| ACID(1) DOSE | CHEMICAL ANALYSIS (WT %, Vf BASIS) | | | | | | | | | SURFACE AREA (m2/g) | PORE VOLUME (cc/g) | SLURRY pH |
| | SiO2 | Al2O3 | Fe2O3 | CaO | MgO | K2O | Na2O | TiO2 | P2O5 | | | |
| CLAY A | | | | | | | | | | | | |
| 0 | 67.4 | 10.2 | 3.88 | 5.39 | 11.3 | 0.87 | 0.04 | 0.5 | — | 95 | 0.29 | 8.6 |
| 10 | 72.7 | 11.4 | 4.05 | 2.76 | 10.8 | 0.88 | 0.09 | 0.53 | — | 126 | 0.32 | 6.4 |
| 20 | 73.5 | 10.5 | 4.04 | 0.53 | 8.77 | 0.86 | 0.08 | 0.55 | — | | | 3.5 |
| 30 | 75.1 | 9.21 | 4.11 | 0.25 | 7.96 | 0.84 | 0.07 | 0.57 | — | 169 | 0.35 | 3.1 |
| 45 | 78.1 | 7.99 | 3.6 | 0.18 | 6.76 | 0.8 | 0.08 | 0.6 | — | | | 2.7 |
| 60 | 80.9 | 6.71 | 2.65 | 0.13 | 5.96 | 0.78 | 0.05 | 0.61 | — | 234 | 0.4 | 2.6 |
| 90 | 85.1 | 4.62 | 1.47 | 0.07 | 4.75 | 0.69 | 0.09 | 0.6 | — | 199 | 0.4 | 2.6 |
| CLAY B | | | | | | | | | | | | |
| 0 | 65.6 | 18.9 | 5.61 | 4.07 | 3.59 | 0.83 | 0.05 | 0.89 | — | 59 | 0.09 | 8.6 |

-continued

CHEMICAL/PHYSICAL PROPERTIES OF STUDY CLAYS

| ACID(1) DOSE | CHEMICAL ANALYSIS (WT %, Vf BASIS) | | | | | | | | | SURFACE AREA (m2/g) | PORE VOLUME (cc/g) | SLURRY pH |
|---|---|---|---|---|---|---|---|---|---|---|---|---|
| | SiO2 | Al2O3 | Fe2O3 | CaO | MgO | K2O | Na2O | TiO2 | P2O5 | | | |
| 10 | 68 | 19.6 | 5.5 | 1.83 | 3.1 | 0.76 | 0.05 | 0.93 | — | 83 | 0.12 | 3.5 |
| 35 | 72.7 | 16.8 | 5.01 | 1.39 | 2.46 | 0.77 | 0.09 | 0.99 | — | 252 | 0.25 | 2.9 |
| 50 | 76.2 | 14.1 | 4.43 | 1.15 | 2.01 | 0.81 | 0.15 | 0.99 | — | 286 | 0.36 | 3.4 |
| 60 | 77.8 | 12.6 | 3.95 | 1.63 | 1.74 | 0.81 | 0.2 | 0.96 | — | 297 | 0.43 | 3.8 |
| 95 | 84.6 | 8.1 | 2.66 | 0.98 | 7.92 | 0.87 | 0.32 | 0.72 | — | 237 | 0.5 | 2.9 |
| CLAY C | | | | | | | | | | | | |
| 0 | 72.1 | 13.1 | 4.62 | 1.55 | 5.76 | 1.26 | 0.29 | 0.58 | 0.69 | 133 | 0.32 | 6.6 |
| 10 | 73.1 | 12.6 | 5.24 | 0.33 | 5.15 | 1.19 | 0.25 | 0.6 | 0.45 | 161 | 0.32 | 2.8 |
| 20 | 74.8 | 12.1 | 4.8 | 0.21 | 4.51 | 1.15 | 0.23 | 0.62 | 0.39 | | | 2.6 |
| 30 | 76.2 | 11.4 | 4.29 | 0.15 | 3.99 | 1.13 | 0.21 | 0.63 | 0.32 | 188 | 0.31 | 2.6 |
| 45 | 79.2 | 10.1 | 3.47 | 0.11 | 3.36 | 1.08 | 0.21 | 0.65 | 0.21 | | | 2.5 |
| 60 | 81.5 | 8.82 | 2.9 | 0.08 | 2.86 | 1.02 | 0.22 | 0.67 | 0.17 | 223 | 0.38 | 2.5 |
| 90 | 84.9 | 6.49 | 1.74 | 0.07 | 2.02 | 0.91 | 0.24 | 0.67 | 0.12 | 205 | 0.38 | 2.5 |

(1) Acid activation conditions: conc. H2SO4; 25 wt % solids; 5.5 hrs; 210 F. where % Acid Dose = (wt. of pure acid × 100)/(wt. of dry clay).

These materials were then used at constant dosage (0.5 wt % clay, as is, based on amount of oil) to treat a typical caustic refined soybean oil. The oil quality parameters previously discussed were then measured as a function of activating acid dosage as shown in TABLE 1, and compared to those obtained when using two commercial bleaching clays, high activity Filtrol Gr 105, and very high activity Filtrol Gr 160.

Data in TABLE 1 show that all of the clay samples tested benefited from the acid-activation process. For example, compare the results obtained at 0% acid dosage (raw clay) versus those obtained at higher acid dosages. Nevertheless, the high purity attapulgite which contained 3% carbonate required at least 20% acid dosage to produce a product capable of achieving an oil quality where the most important quality parameter, chlorophyll, falls in the desired range (50 to 90 ppb). The high purity bentonite required even higher dosages (in the range 45–90%) to achieve comparable bleaching activity. In contrast, the high susceptibility source clay which contains both attapulgite and calcium bentonite achieved a comparable chlorophyll bleaching efficiency with as little as 10% acid dosage.

TABLE 1

EFFECT OF CLAY SOURCE ON RESPONSE TO ACID ACTIVATION AND ADSORPTION EFFICIENCY FOR TREATING OIL

| SOURCE CLAY | % ACID DOSE(a) | LOVIBOND RED | CHLOROPHYLL (PPB) | PEROXIDE VAIUE | % FFA (WT %) |
|---|---|---|---|---|---|
| A | 0 | 10.2 | 303 | 8.2 | 0.035 |
| | 10 | 9.7 | 194 | 7.0 | 0.041 |
| | 20 | 2.5 | 43 | 2.6 | 0.038 |
| | 30 | 2.4 | 49 | 2.6 | 0.039 |
| | 45 | 2.6 | 64 | 2.7 | 0.045 |
| | 60 | 4.1 | 31 | 4.0 | 0.042 |
| | 90 | 8.2 | 134 | 6.6 | 0.042 |
| B | 0 | 13.9 | 660 | | |
| | 10 | 13.6 | 520 | | |
| | 20 | 13.4 | 381 | | |
| | 30 | 10.2 | 232 | | |
| | 45 | 8.0 | 85 | | |
| | 60 | 3.8 | 37 | | |
| | 90 | 2.6 | 15 | | |
| C | 0 | 3.5 | 160 | 4.2 | 0.039 |
| | 10 | 2.2 | 54 | 0.6 | 0.040 |
| | 20 | 2.1 | 52 | 0.5 | 0.051 |
| | 30 | 2.1 | 54 | 0.5 | 0.042 |
| | 45 | 2.2 | 62 | 0.5 | 0.040 |
| | 60 | 2.1 | 60 | 0.6 | 0.044 |
| | 90 | 2.2 | 74 | 1.3 | 0.043 |
| Gr 105 | — | 8.0 | 88 | 6.2 | 0.047 |
| Gr 160 | — | 3.8 | 34 | 3.4 | 0.049 |
| Starting Oil | — | 15.2 | 715 | 9.7 | 0.045 |

(a) % Acid Dose = (wt. of pure acid × 100)/(wt. of dry clay)

EXAMPLE 2

A sample of high susceptibility source clay (C) was dried at 110° C. to 10.5 wt % LOI (loss on drying, 300° C./1 hour), ground (90% <200 mesh) and then samples were spray-coated with dilute (10%–25%) sulfuric acid solutions to yield samples which were subjected to acid dosages between 1–8 wt %. The spray-coating was accomplished by spraying a mist of the dilute sulfuric acid solution into a rotating vessel containing the dried, powdered samples of high susceptibility clay. After allowing the samples to equilibrate at room temperature for three days in closed containers, they were redried (at 110° C.) to 10.5 wt % LOI, and any agglomerates broken up so that the final sample was at least 90%–200 mesh.

These samples were then evaluated as in Example 1 (i.e.,—0.5 wt % clay, as is, based on amount of oil).

TABLE 2
EFFECT OF ACID DOSAGE ON BLEACHING ACTIVITY OF SPRAY-COATED HIGH SUSCEPTIBILITY SOURCE CLAY

| SOURCE CLAY | % ACID DOSE(a) | LOVIBOND RED | CHLOROPHYLL (PPB) | PEROXIDE VALUE | % FFA (WT %) |
|---|---|---|---|---|---|
| C | 1 | 3.2 | 60 | 4.0 | 0.038 |
|   | 3 | 2.7 | 53 | 1.9 | 0.037 |
|   | 5 | 2.9 | 67 | 1.5 | 0.040 |
|   | 8 | 4.3 | 86 | 3.3 | 0.040 |
| Gr 160 | — | 3.7 | 36 | 3.4 | 0.049 |
| Starting Oil | — | 15.2 | 710 | 9.2 | 0.039 |

(a) See footnonte (a), TABLE 1.

As shown in TABLE 2, dosages as low as 1 wt % sulfuric acid were sufficient to produce good activity bleaching clays. In this case, all of the acid added to the clay remained associated with that sample, although conversion to calcium and magnesium salts via reaction with the high susceptibility clay is highly likely. At any rate, adsorptive activities of these materials as well as their tendency to generate free fatty acids were quite acceptable even through none of the samples received any subsequent washing (a salient feature of being able to use this process with high susceptibility source clays.) Using this procedure, optimum bleaching activities appeared to be realized when acid dosages were 3-5 wt %.

More specifically, data in TABLE 2 show better reduction of red color and peroxide value (in the oil) was obtained with the high susceptibility source clay when activated with 3-5 wt % sulfuric acid than was realized with premium quality Filtrol Gr 160 bleaching clay. Increased production of free fatty acids was nil with the spray-coated high susceptibility source clay, whereas increased production of free fatty acids was clearly evident with the commercial Filtrol Gr 160 bleaching clay. Although the spray-coated high susceptibility source clay was not as efficient as Gr 160 bleaching clay for removing green color (chlorophyll) on an equal weight basis, it would still be considered adequate, particularly in view of its other superior qualities.

EXAMPLE 3

A sample of high susceptibility source clay (C) was sized to an average of ¼" and dried to a moisture content of about 20 wt % (LOI @1,000° C.). The clay sample was then slurried (24 wt % VF clay weight) with water/sulfuric acid at either 5% or 10% acid dosage for three hours at 210° F. After the reaction period was over, the samples were filtered, and in some cases washed with additional volumes of water, and then dried and ground as previously described in Example 2.

Table 3 give the results of the activity testing (as described above) for these samples versus the degree of washing they received. One measure of the degree of washing was the residual acidity exhibited by these materials. Residual acidity was determined by boiling 5 grams (as is basis) of clay with 100 ml of distilled water or 3 minutes, filtering, adding 100 ml of hot distilled water to the filter cake just before it dried, and repeating one more time. The filtrate (plus one drop of phenolphthalein indicator solution) was then titrated with 0.0893 N KOH solution to the pink end point. The residual acidity is reported as mg of KOH/gram of clay (and can be obtained as a direct reading of the buret in milliliters when using 0.0893 N KOH solution). As can be seen from data in Table 3, washing, or the lack of washing (as measured by residual acidity) has no effect on the performance of the activated bleaching clay when prepared at 5% acid dosage level. At the 10% acid dosage level, the unwashed sample shows some loss of efficiency for removing chlorophyll, and a slight tendency to increase free fatty acids; however, the values obtained are well with the acceptable range. Also, even lower peroxide values were obtained with the materials prepared at the 10% dosage.

TABLE 3
EFFECT OF WASHING (AS MEASURED BY RESIDUAL ACIDITY) ON BLEACHING ACTIVITY OF HIGH SUSCEPTIBILITY SOURCE CLAY

| Residual Acidity[1] Water[2] | Volume Wash | Lovibond Red Value | Chlorophyll (ppb) | Peroxide Value | % FFA (wt %) |
|---|---|---|---|---|---|
| (5% acid dosage) | | | | | |
| 6.9 | None | 2.8 | 47 | 1.9 | 0.041 |
| 2.5 | 0.73 | 2.7 | 45 | 1.8 | 0.042 |
| 2.2 | 1.45 | 2.7 | 46 | 1.5 | 0.038 |
| 1.6 | 2.90 | 2.8 | 47 | 1.7 | 0.043 |
| (10% acid dosage) | | | | | |
| 14.6 | None | 3.0 | 61 | 0.9 | 0.046 |
| 4.1 | 1.45 | 2.8 | 48 | 0.6 | 0.041 |
| 3.0 | 2.90 | 3.8 | 48 | 0.7 | 0.042 |
| 2.2 | 5.80 | 2.9 | 48 | 0.9 | 0.041 |
| Gr 160 | — | 3.6 | 34 | 2.7 | 0.045 |
| Starting Oil | — | 15.2 | 715 | 10.1 | 0.044 |

[1] mg KOH/gm clay.
[2] liters water/60 gram clay.

A series of no-wash acid activations was carried out using HSSC, an acidic sedimented naturally occurring mixture of attapulgite and calcium bentonite mined near Ochlocknee. A description of the chemical and physical properties of this clay appears in Example 1.

EXAMPLE 4

Acid-activated samples of HSSC Hole #1 (composite) clay were prepared at the 1, 3 and 5% acid dosage levels by adding the clay to water and sulfuric acid so that the volatile free solids content at the resultant clay/acid/water slurry was 25 wt %. The slurries were then heated for 1, 3 and 5.5 hours at temperatures of 77, 110, 140, 175 and 210° F. The acid treated samples were ground and dried as in Example 1. The 1 and 3 hour samples were obtained by extracting portions (40 cc) of the clay-acid slurry from the reaction flask using a wide-mouthed baster. The 5.5 hour sample was composed of the material remaining in the flask at the end of the run. Following the treatment period, the samples were filtered, and the resulting cakes dried at 30° C.. The samples were then ground to 100%–200 mesh.

The acid-activated HSSC, the unactivated HSSC, and Gr 105 and Gr 160 standards (sized to 100%–200 mesh) were contacted with refined soybean oil at 0.5 wt % dosage. The bleaching results (TABLES 4-8) show that the activity of the acid-activated products was primarily affected by acid dosage level, rather than time or temperature. The products treated at 1% acid dosage were clearly less active than those treated at 3 and 5% dosages. However, treatment at the 3% level was sufficient to obtain maximum activity.

Effects on bleaching activity due to time and temperature (TABLES 4-6) were associated mainly with the removal of red color and, to a lesser extent, the peroxides. In fact, only for the 1% acid-activated case did the beneficial effects of increasing temperature cause consistent and significant reductions in the levels of these components. The effects of time in this case, and both time and temperature for the 3 and 5% acid dosage levels, appear less significant.

Under optimum conditions, the acid-activated HSSC clay prepared in this study showed an activity for red removal which comes between Gr 105 and Gr 160 (compare Table 5 with Table 7). Regarding the removal of chlorophyll and peroxides, acid-activated HSSC clay was comparable to Gr 160. These results differed from those previously observed in that activated HSSC was comparable to or better than Gr 160 in the removal of red color and peroxides, but slightly less so in the removal of chlorophyll. It is believed that the difference arises from the different soybean oil feedstocks used in the tests. An evaluation of the relative bleaching efficiencies of the 3%/3 hours 110° F. sample and the unactivated source clay vs. Gr 105 Std. are given in TABLE 8.

The results of these experiments show that acid dosage, not time and temperature, is the key variable in determining the bleaching activity of acid-activated HSSC clay. As long as the acid dosage level was 3% or higher, optimum activity resulted. Furthermore, at optimum activity the acid-activated product was competitive with Gr 160 and better than Gr 105 when bleaching refined soybean oil.

Based on these results, recommendations conditions for no-wash acid activation of HSSC clay are as follows:

| | |
|---|---|
| Treater Feed Moisture Content | 20% VM |
| Acid Dosage | 3% (no less) |
| Time | 3 hr. |
| Temperature | 140° F. (Although ambient temperature (77° F.) activations gave products which were quite active, it is advisable to heat the clay-acid slurry when activating on a commercial scale in order to minimize thickening which becomes significant at lower temperatures.) |
| Solids Content | 25% VF max. |
| Finished product specifications: | |
| Moisture Content | 15-20% VM |
| Particle Size | 90% −200 mesh |
| pH and Residual Acidity | Typical values will lie in the 2.5-3.0 and 5.0-10.0 ranges, respectively. |

TABLE 4

REFINED SOYBEAN OIL(a) BLEACHED(b) WITH 1% ACID-ACTIVATED HSSC(c)

| Average Values | Lv Red - | 7.7 |
|---|---|---|
| | Chlorophyll - | 93 ppb |
| | Peroxide - Value | 1.0 |

| TEMP (F) | ACTIVATION TIME (HR) | | | BLEACHED OIL PROPERTY |
|---|---|---|---|---|
| | 1 | 3 | 5.5 | |
| 77 | 8 | 7.6 | 8 | Lv RED |
| | 92 | 76 | 76 | CHLOR (PPB) |
| | 1 | 1.1 | 1.1 | PV |
| 110 | 8.1 | 8.8 | 8.2 | |
| | 101 | 101 | 107 | |
| | 1 | 1.2 | 1.2 | |
| 140 | 8.2 | 8.2 | 7.9 | |
| | 108 | 96 | 82 | |
| | 1.2 | 1.2 | 0.9 | |
| 175 | 7.8 | 6.9 | 6.7 | |
| | 102 | 90 | 82 | |
| | 1.1 | 0.9 | 0.5 | |
| 210 | 6.8 | 6.3 | 7.2 | |
| | 89 | 71 | 99 | |
| | 0.7 | 0.6 | 0.8 | |

(a) Uncontacted oil-15.5 Lv red; 620 ppb chlorophyll; 1.6 peroxide value.
(b) Oil contacted with 0.5 wt % clay at 200° F. for 15 min. under vacuum of 28.5 in. Hg.
(c) High susceptibility source clay from Georgia.

TABLE 5

REFINED SOYBEAN OIL(a) BLEACHED(b) WITH 3% ACID-ACTIVATED HSSC(c)

| Average Values | Lv Red - | 6.0 |
|---|---|---|
| | Chlorophyll - | 42 ppb |
| | Peroxide - Value | 0.5 |

| TEMP (F) | ACTIVATION TIME (HR) | | | BLEACHED OIL PROPERTY |
|---|---|---|---|---|
| | 1 | 3 | 5.5 | |
| 77 | 6.1 | 6.6 | 5.8 | Lv RED |
| | 33 | 38 | 38 | CHLOR (PPB) |
| | 0.3 | 0.5 | 0.5 | PV |
| 110 | 6.1 | 6 | 5.7 | |
| | 46 | 37 | 34 | |
| | 0.6 | 0.4 | 0.4 | |
| 140 | 6 | 5.5 | 6.9 | |
| | 39 | 36 | 55 | |
| | 0.5 | 0.4 | 0.6 | |
| 175 | 6.1 | 6.1 | 5.6 | |
| | 38 | 41 | 51 | |
| | 0.4 | 0.4 | 0.8 | |
| 210 | 5.9 | 6.1 | 5.7 | |
| | 57 | 46 | 40 | |
| | 0.5 | 0.5 | 0.5 | |

(a) Uncontacted oil-15.5 Lv red; 620 ppb chlorophyll; 1.6 peroxide value.
(b) Oil contacted with 0.5 wt % clay at 200° F. for 15 min. under vacuum of 28.5 in. Hg.
(c) High susceptibility source clay from Georgia.

TABLE 6

REFINED SOYBEAN OIL(a) BLEACHED(b) WITH 5% ACID-ACTIVATED HSSC(c)

| Average Values | Lv Red - | 6.5 |
|---|---|---|
| | Chlorophyll - | 45 ppb |
| | Peroxide - Value | 0.5 |

| TEMP (F) | ACTIVATION TIME (HR) | | | BLEACHED OIL PROPERTY |
|---|---|---|---|---|
| | 1 | 3 | 5.5 | |
| 77 | 7.1 | 6.8 | 6.9 | Lv RED |
| | 47 | 45 | 42 | CHLOR (PPB) |
| | 0.5 | 0.5 | 0.5 | PV |
| 110 | 6.8 | 6.5 | 6.1 | |
| | 38 | 41 | 40 | |
| | 0.4 | 0.4 | 0.5 | |
| 140 | 6.3 | 6.2 | 5.5 | |
| | 44 | 34 | 37 | |
| | 0.5 | 0.5 | 0.3 | |

TABLE 6-continued

| 175 | 6.9 | 6.7 | 6.2 |
|---|---|---|---|
|  | 53 | 55 | 46 |
|  | 0.5 | 0.6 | 0.6 |
| 210 | 6.2 | 7.3 | 6.4 |
|  | 37 | 71 | 49 |
|  | 0.3 | 0.7 | 0.6 |

(a) Uncontacted oil-15.5 Lv red; 620 ppb chlorophyll; 1.6 peroxide value.
(b) Oil contacted with 0.5 wt % clay at 200° F. for 15 min. under vacuum of 28.5 in. Hg.
(c) High susceptibility source clay from Georgia.

TABLE 9

EFFECT OF PROCESSING VARIABLES ON EFFICIENCY OF ACID-ACTIVATED HIGH SUSCEPTIBILITY SOURCE CLAY

| SAMPLE | TREATER TIME (hr) | TEMP (F) | BLEACHING EFFIC. (a) CHLOROPHYLL (PPB) | LOVIBOND RED | FILTER TIME (b) (sec) | MESH(c) T-200 (WT %) | Vm (WT %) | pH | RESIDUAL ACIDITY (d) |
|---|---|---|---|---|---|---|---|---|---|
| Gr 105 STD | — | — | 100 | 100 | 145 | — | — | — | — |
| Gr 105 SF | — | — | 100 | 100 | 39 | — | — | — | — |
| HSSC RUN # | | | | | | | | | |
| 1 | 3 | 130 | 111 | 110 | 88 | 83 | 18.1 | 3.2 | 8.9 |
| 2 | 1 | 150 | 116 | 122 | 108 | 93 | 20.1 | 3.4 | 107 |
| 3 | 4.5 | 150 | 122 | 110 | 58 | 98 | 23.6 | 3.3 | 108 |
| 4 | 3.5 | 135 | 115 | 100 | 46 | 97 | 26.6 | 2.9 | 7.2 |
| 5 | 4 | 130 | | | | | | | |
| (FINE) | | | 104 | 88 | 55 | 88 | 20.9 | 2.4 | 8.9 |
| (COARSE) | | | 66 | 70 | 30 | 56 | 30.7 | 2.2 | 8.1 |
| 6 | 4.5 | 160 | | | | | | | |
| (FINE) | | | 86 | 90 | 36 | 74 | 26.1 | 2.7 | 8.1 |
| (MEDIUM) | | | 88 | 80 | 53 | 64 | 30.1 | 2.2 | 7.4 |
| (COARSE) | | | 75 | 82 | 43 | 56 | 23.5 | 2.2 | 8.3 |

(a) See footnotes (a), (b), TABLE 8.
(b) 1 wt % clay in 150 gm soya oil; contacted for 5 min. at 248 F. Mixture suction filtered hot through 11 cm Whatman No. 2 filter paper.
(c) Particle size; wt % of sample passing Tyler screen of 200 mesh.
(d) Measured in mg KOH/gm clay.

TABLE 7

BLEACHED(a) SOYBEAN OIL PROPERTIES

| SAMPLE | Lov RED | CHLOROPHYLL (PPB) | PEROXIDE VALUE |
|---|---|---|---|
| STARTING OIL | 15.5 | 620 | 1.6 |
| UNACT. HSSC | 9.0 | 128 | 1.3 |
| 3-5% H2SO4 ACID-ACT. HSSC | 6.3 | 44 | 0.5 |
| GR 105 STD | 8.4 | 89 | 0.9 |
| GR 160 STD | 4.9 | 36 | 0.6 |

(a) See footnote b., Table 4.

TABLE 8

BLEACHING EFFICIENCY OF ACID-ACTIVATED AND UNACTIVATED HSSC VS. GR 105 STD IN REFINED SOYBEAN OIL

| SAMPLE | BLEACHING EFFICIENCY @ 3 Lv RED (a) | @ 30 PPB CHLOROPHYLL (b) |
|---|---|---|
| GR 105 STD | 100 | 100 |
| UNACT. HSSC | 98 | 85 |
| ACT. HSSC (3%/3hr/110 F) | 116 | 137 |

(a) Bleaching efficiency @ 3 Lv Red = (wt of STD to 3 Lv Red × 100)/(wt of unknown to 3 Lv Red)
(b) Bleaching efficiency @ 30 PPB chlorophyll = (wt of STD to 30 PPB Chlor × 100)/(wt of unkn. to 30 PPB Chlor)

EXAMPLE 5

A series of (no wash) acid-activated products, using HSSC Hole #1 as source material, were prepared at 4% acid dosage under variable time and temperature conditions. The run conditions, bleaching efficiencies (in refined soybean oil), filtration times and selected phsyiochemical properties for the products are summarized in TABLE 9. The results shows that the more finely ground products (Runs 1-4, and 5 [fine]) exhibited bleaching activities comparable to or slightly greater than Gr 105, while maintaining much improved filtration rates (lower times). In particular, samples from runs 3,4 and 5 (fine) show rates which are almost as fast as Gr 105 SF (which is a fast filtering version of GR 105).

EXAMPLE 6

Mineral acids hydrochloric, phosphoric and sulfuric, a strong organic acid (formic) and a complexing acid (citric) were used with HSSC in practice of the invention. Conditions used in the acid treatments are described in TABLE 10 and TABLE 11.

Using slurry activation conditions, some selective differences in removing pigments and other trace constituents from soya oil were noted as a function of the type of acid used; however, overall adsorptive capacity relative to the unactivated clay was always improved except for free fatty acids rise where the raw clay acts as a net adsorber of free free fatty acids (see TABLE 10).

Data in TABLE 11 show that different acids can be simply spray coated onto the HSSC to yield improved products, but it is clear that Lovibond red color and peroxides in the oil were most reduced when sulfuric acid was utilized. For chlorophyll reduction, phosphoric or citric treated products showed a slight advantage. In all cases, the sulfuric acid treated HSSC was equivalent or superior to the use of Oil Dri PureFlow B80 when the oil was treated with 4% citric acid before bleaching. As is also clear from this table, neither pure attapulgite nor pure bentonite clays respond to these low acid-dosage activations as well as HSSC.

Figure 5:
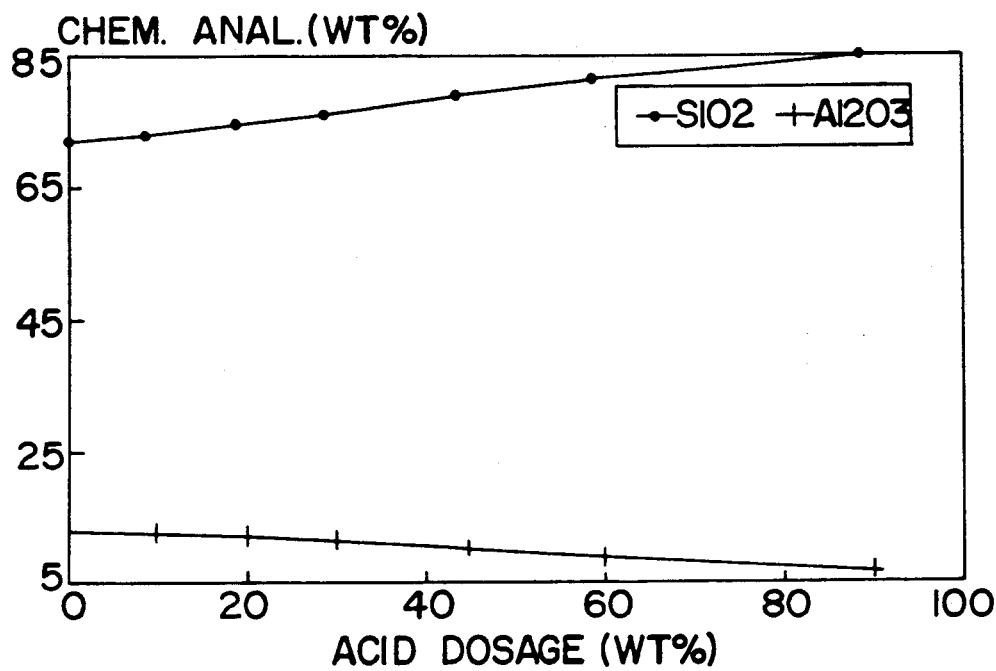
FIGS. 5 and 6 are graphs showing the effect of increasing acid (sulfuric) dosage on the chemical composition of a HSSC clay.
Figure 6:
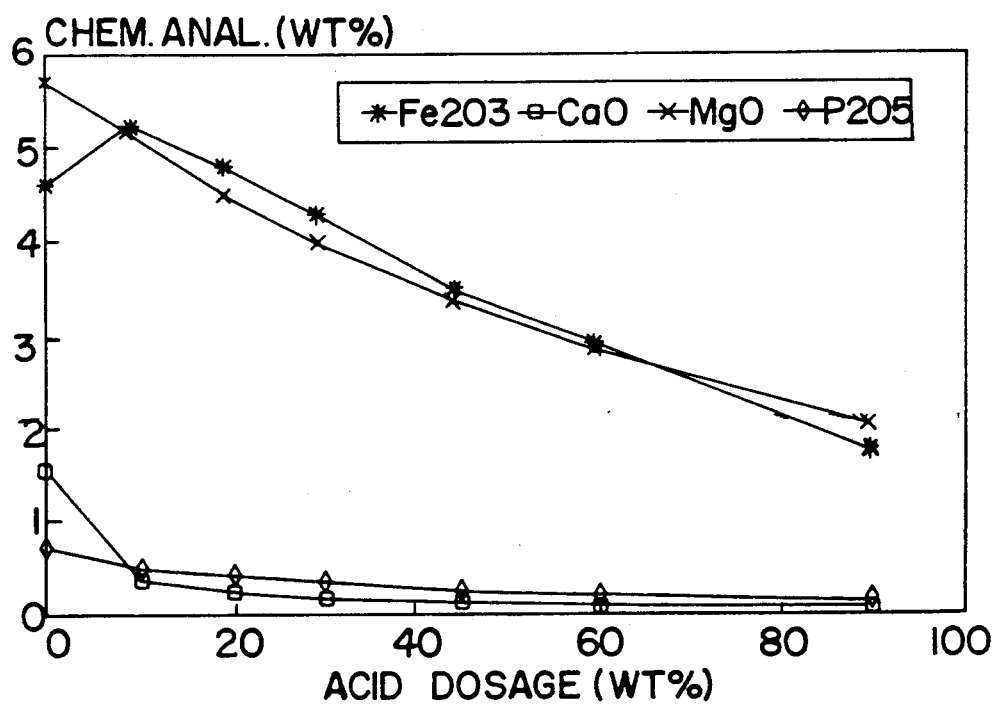

As can be seen from tabulated chemical analyses in Example 1 and accompanying FIGS. 5 and 6, treatment with acid tends to reduce $Fe_2O_3$, CaO, MgO, and $P_2O_5$ content at all dosage levels (accompanied by an apparent increased in $SiO_2$ content). Only at the higher acid dosages is $Al_2O_3$ significantly removed from the clay. This suggests that exchange of $Ca^{++}$ and $Mg^{++}$ for protons is the primary role of the acid at lower dosages, but that actual leaching of the clay structure (i.e.—removal of structural ions) does begin to occur at the higher acid dosages.

The processes just described have numerous economic and procedural advantages over the process normally employed: (1) lower acid costs per unit mass of clay treated; (2) lower production costs (no washing, filtering, or waste treatments steps); and (3) environmental soundness (i.e.—no harmful environmental waste products are produced). Considering the fact that attapulgite clays are not normally used as the source of acid activated clay and almost a century of effort has been directed to manufacturing and improving acid-activated bleaching earths, the results were unexpected. It is believed that the vast number of prior art investigators overlooked the effect of carbonate (limestone) impurities on the activation process, thereby failing to note that certain palygorskite/bentonite clays (those naturally acidic, hence low in free carbonate) would be amendable to a simple, cost effective treatment.

TABLE 10

EFFECT OF DIFFERENT ACIDS

| ACID DOSAGE (WT %) | ACID CONC. (MMOL/100 GM CLAY) | ACID TYPE | .5 WT % DOSAGE | | | .7 WT % DOSAGE | | |
|---|---|---|---|---|---|---|---|---|
| | | | Lv RED | Lv GREEN (ppm) | PV | Lv RED | % FFA | PV |
| Raw Clay | | NONE | 8.1 | 93 | | 5.9 | 0.05 | |
| 5 | 0.538 | H2SO4 | 3.8 | 28 | 0.8 | 3 | 0.054 | 0.6 |
| 5 | 0.538 | H3PO4 | | | | 4.5 | 0.054 | 1.02 |
| 9.5 | 1.08 | H3PO4 | | | | 5.4 | 0.056 | 0.84 |
| 3.8 | 1.08 | HCL | 5 | 6 | 1.04 | 4.9 | 0.059 | 2.35 |
| 5 | 1.44 | HCL | 4.9 | 7 | 0.95 | 4.1 | 0.057 | 1.53 |
| 4.7 | 1.08 | HCO2H | 5.1 | 27 | 1.95 | 2.7 | 0.05 | 0.9 |
| 5 | 1.15 | HCO2H | | | | 2.8 | 0.05 | 0.92 |
| 5 | 0.274 | CITRIC | | | | 5 | 0.053 | 1 |
| 17 | 1.08 | CITRIC | 7.3 | 28 | 1.3 | 4.1 | 0.055 | 0.68 |
| Starting Oil | | | 16.6 | 625 | | | 0.052 | |

Activation conditions: 80 Vf gms HSSC added to water (25 wt % solids), and then sufficient acid to achieve indicated concentrations. Slurries heated at 160 C/1 hr. Reaction mixtures then quenched in 300 cc D.I. water, filtered, dried, and ground.

TABLE 11

ACID-SPRAYED HSSC(1) VS. CLAY TYPE AND ACID TYPE

| CLAY TYPE | ACID TYPE | WT % ACID | | | | OD + CIT(4) |
|---|---|---|---|---|---|---|
| | | 0% | 1% | 3% | 5% | |
| Lovibond Red | | | | | | |
| HSSC(1) | H2SO4 | 8.1 | 3.2 | 2.7 | 2.9 | |
| ATTA(2) | | 10.2 | 11.4 | 8.6 | 9.1 | |
| MONT(3) | | 12.4 | 14.5 | 14 | 14.6 | |
| HSSC(1) | H3PO4 | 8.1 | 6.9 | 7.5 | 8.5 | |
| ATTA(2) | | 10.2 | 11.3 | 10.8 | 11.3 | |
| MONT(3) | | 12.4 | 14 | 14.1 | 14 | |
| HSSC(1) | CITRIC | 8.1 | 7.8 | 6.9 | 7.1 | |
| ATTA(2) | | 10.2 | 9.7 | 10 | 8.8 | |
| MONT(3) | | 12.4 | 13.9 | 14.5 | 14.4 | 2.8 |
| Chlorophyll (ppm) | | | | | | |
| HSSC(1) | H2SO4 | 166 | 60 | 53 | 67 | |
| ATTA(2) | | 303 | 302 | 208 | 188 | |
| MONT(3) | | 660 | 686 | 695 | 689 | |
| HSSC(1) | H3PO4 | 166 | 97 | 43 | 55 | |
| ATTA(2) | | 303 | 281 | 223 | 167 | |
| MONT(3) | | 660 | 696 | 694 | 678 | |
| HSSC(1) | CITRIC | 166 | 100 | 42 | 36 | |
| ATTA(2) | | 303 | 220 | 140 | 94 | |
| MONT(3) | | 660 | 650 | 614 | 603 | 55 |
| Peroxide Value | | | | | | |
| HSSC(1) | H2SO4 | 7.1 | 4 | 1.9 | 1.5 | |
| ATTA(2) | | 8.2 | 8 | 7.3 | 7.5 | |
| MONT(3) | | 8.6 | 9.2 | 9.2 | 9 | |
| HSSC(1) | H3PO4 | 7.1 | 6.6 | 5.4 | 4.9 | |
| ATTA(2) | | 8.2 | 8 | 7.7 | 7.8 | |
| MONT(3) | | 8.6 | 9 | 9.3 | 9.6 | |
| HSSC(1) | CITRIC | 7.1 | 6.8 | 6 | 5 | |
| ATTA(2) | | 8.2 | 7.5 | 7.5 | 7 | |
| MONT(3) | | 8.6 | 9 | 9.3 | 9 | 3.6 |

(1) High Susceptibility Source Clay: Acitvation Conditons in all cases: 90% −200 mesh clay tumbled in gallon flask and 10–25 wt % acid solution sprayed on at rm temperature. Treated clay equilibrated 3 days at room temperature, then dried back to original Vm.
(2) Attapulgite - Engelhard 200 UP/LVM.
(3) Montmorillonite - Filtrol Gr 2.
(4) Oil Dri PF B80 using 4% citric acid treated oil.

We claim:

1. A method for producing bleaching earth from clay which comprises selecting a naturally-occurring acidic mixture of palygorskite and bentonite clays, mixing said selected clay mixture with an acid solution in amount corresponding to an acid dosage in the range of 1 to 10% by weight, reacting said clay with said acid and, without washing the resulting reaction product with water, recovering it for use as a bleaching earth.

2. The method of claim 1 wherein said selected clay has a slurry pH in the range of 5 to 7.

3. The method of claim 1 wherein said clay has a pore volume in the range 0.15–0.50 cc/gm.

4. The method of claim 1 wherein said selected clay contains no more than about 5% $CO_2$ by weight on a moisture free weight basis.

5. The method of claim 1 wherein said selected clay is a naturally-occurring mixture of the mineral attapulgite and bentonite.

6. The method of claim 5 wherein said selected clay contains from about 10% to 90% attapulgite.

7. The method of claim 5 wherein said selected clay contains about 20–60% attapulgite.

8. The method of claim 1 wherein the acid dosage is in the range of 3 to 5%.

9. The method of claim 1 wherein said mixture is heated at a temperature in the range of 77° to 210 ° F. to react said clay with said acid.

10. The method of claim 1 wherein said selected clay is dried and ground before mixing with said acid.

11. The method of claim 1 wherein said mixture of clay and acid is heated while it is spray dried.

12. The method of claim 1 wherein said mixture of clay and acid is formed by spraying acid solution onto dried clay.

13. The method of claim 1 wherein said clay is dried and ground, mixed with acid solution, filtered after heating, and filtrate is recycled.

14. The method of claim 1 wherein said acid is sulfuric.

15. The method of claim 1 wherein said acid is selected from the group consisting of sulfuric, phosphoric, hydrochloric, formic and citric.

16. A method for producing bleaching earth from naturally-occurring mixture of attapulgite and bentonite clays in which the attapulgite content is from 10% to 90% by weight, said clay mixture having a slurry pH in the range of at least 5 and below 7 and a pore volume in the range of 0.25–0.35 cc/gm, mixing said clay with a solution of sulfuric acid in amount corresponding to an acid dosage in the range of 1 to 10% by weight, heating said mixture to react said clay with said acid and, without washing the resulting reaction product, recovering it for use as a bleaching earth.

17. The method of claim 16 wherein said clay contains no more than about 5% $CO_2$ by weight on a moisture free weight basis.

18. The method of claim 16 wherein said selected clay contains at from about 20% to 60% attapulgite.

19. The method of claim 16 wherein the acid dosage is in the range of 3 to 5%.

20. The method of claim 16 wherein said mixture is heated at a temperature in the range of 77° to 210° F.

21. The method of claim 16 wherein said clay is dried and ground before mixing with said acid.

22. The method of claim 16 wherein said mixture of clay and acid is heated while it is spray dried.

23. The method of claim 16 wherein said mixture of clay and acid is formed by spraying acid solution onto dried clay.

24. The method of claim 16 wherein said clay is dried and ground, mixed with acid solution, filtered after heating, and filtrate is recycled.

25. The bleaching earth product obtained by the method of claim 1 or 16.

* * * * *